Figure 1:
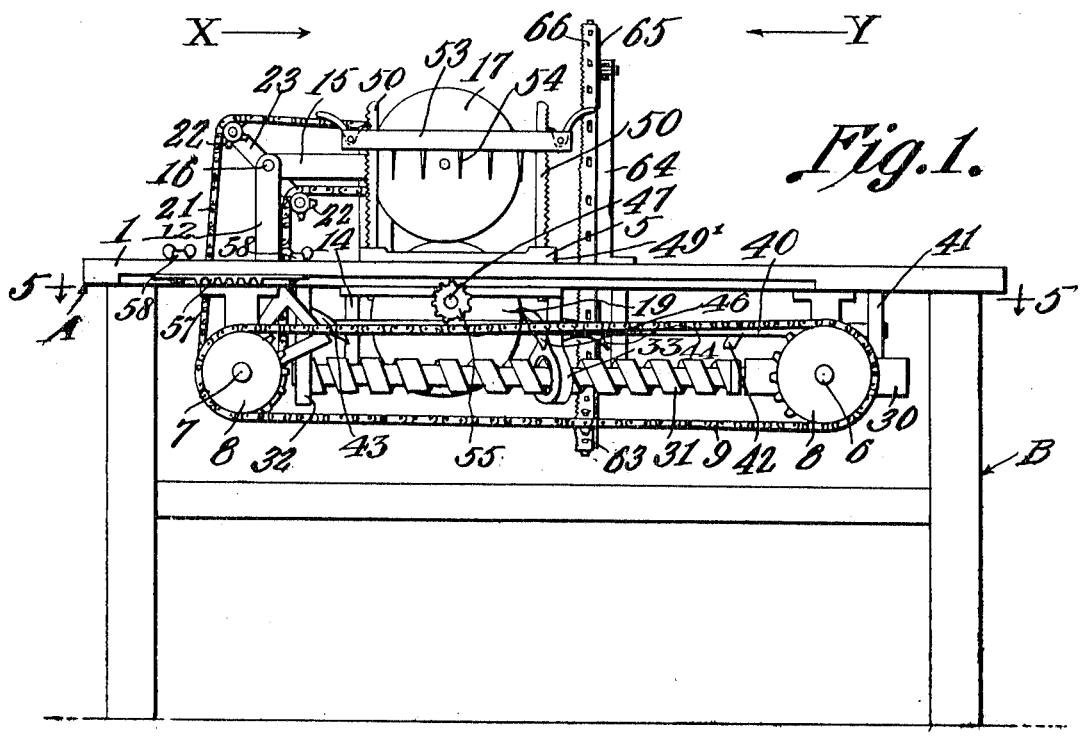

R. E. FORMAN.
CUTTING AND SLICING MACHINE.
APPLICATION FILED JAN. 19, 1912.

1,106,035.

Patented Aug. 4, 1914.
3 SHEETS—SHEET 1.

Witnesses

R. E. Forman,
Inventor by C. A. Snow & Co.
Attorneys

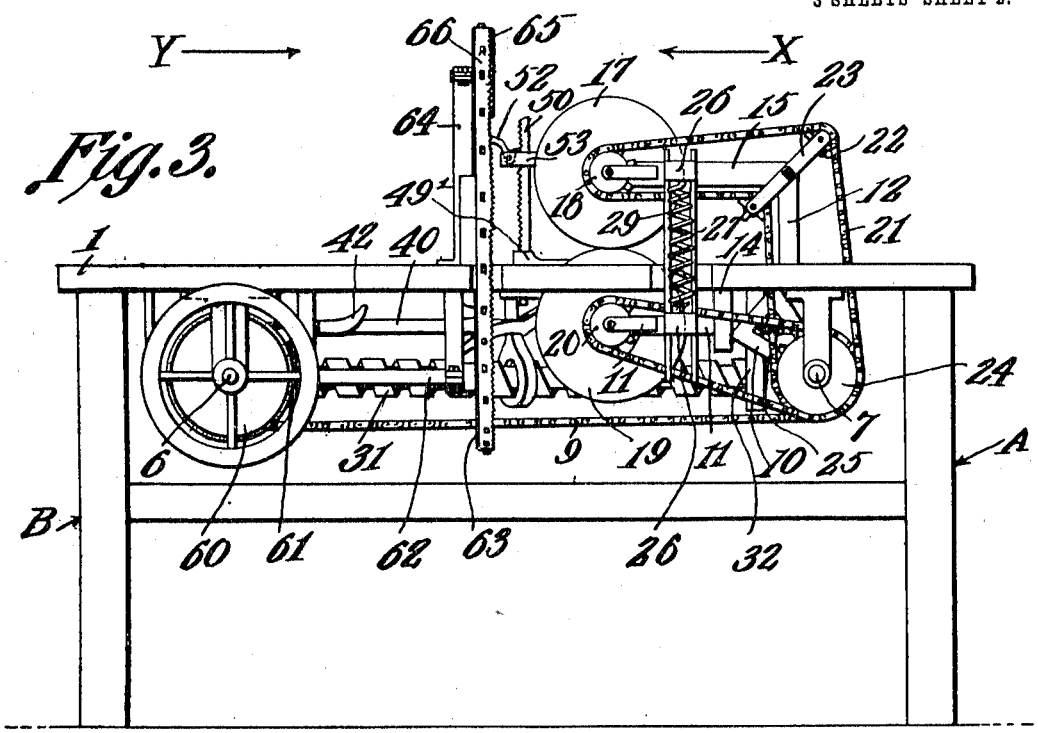

R. E. FORMAN.
CUTTING AND SLICING MACHINE.
APPLICATION FILED JAN. 19, 1912.
1,106,035.
Patented Aug. 4, 1914.
3 SHEETS—SHEET 3.
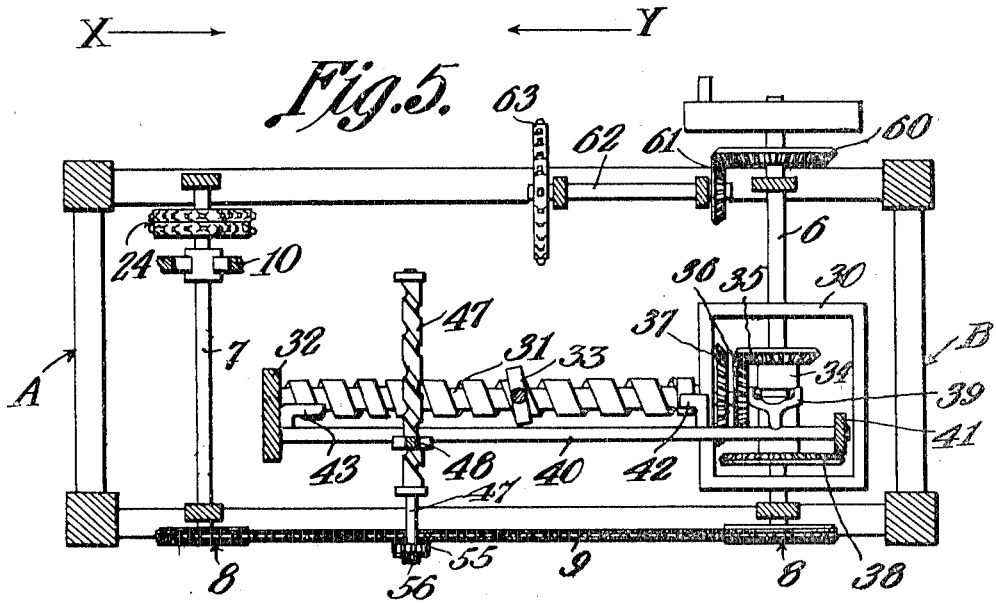
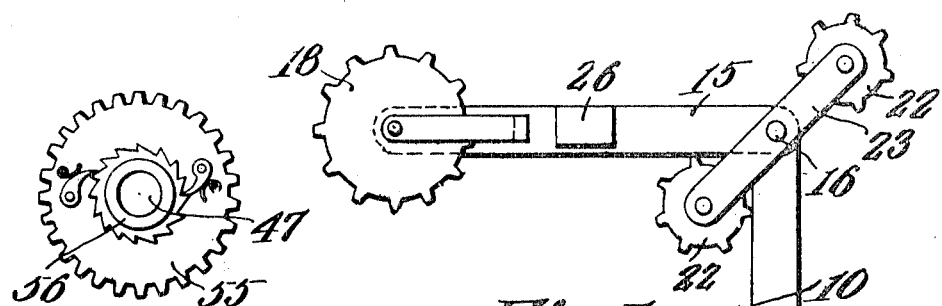
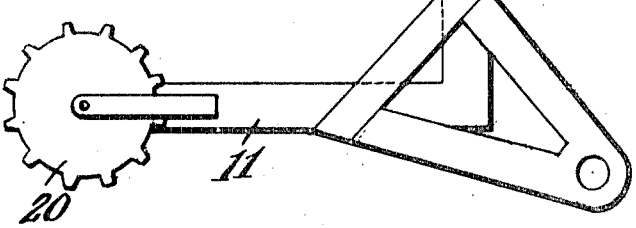
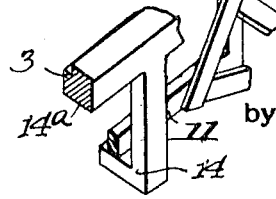
Witnesses
R. E. Forman,
Inventor
by
Attorneys

UNITED STATES PATENT OFFICE.

ROBERT E. FORMAN, OF PARIS, KENTUCKY, ASSIGNOR OF ONE-HALF TO J. R. HAINLINE, OF MOUNT STERLING, KENTUCKY.

CUTTING AND SLICING MACHINE.

1,106,035. Specification of Letters Patent. Patented Aug. 4, 1914.

Application filed January 19, 1912. Serial No. 672,129.

*To all whom it may concern:*

Be it known that I, ROBERT E. FORMAN, a citizen of the United States, residing at Paris, in the county of Bourbon and State of Kentucky, have invented a new and useful Cutting and Slicing Machine, of which the following is a specification.

The device forming the subject-matter of this application is adapted to be employed for cutting meat into slices and for sawing bones as the slices are cut off.

The meat is held upon a reciprocating carriage, the sliding movement of which is reversed in direction through the reversal in the direction of rotation of a lead screw with which the carriage is connected. This movement of the carriage through the operation of the lead screw, serves to advance the meat with respect to the cutting mechanism for the purpose of severing the slice. Upon the carriage is mounted a device which is movable transversely of the direction of movement of the carriage, thereby to move the meat transversely of the meat-cutting instrumentalities, the thickness of the slice being thereby regulated. Two meat-cutting mechanisms are provided. One of these mechanisms consists of a pair of rotary knives, adapted to sever the flesh, one knife being yieldably supported so that a bone may pass between the knives. The other of the cutting mechanisms preferably takes the form of a band saw which severs the bone after the flesh has been severed by the rotary knives hereinbefore described.

The invention aims to provide novel means for mounting the carriage slidably and for procuring a reversal of the movement of the carriage; to provide novel means for yieldably supporting one of the rotary cutting knives, and to provide means for actuating both of the knives; to provide novel means for mounting and for actuating the bone-severing band saw; and to provide novel means for advancing the meat transversely of the line of movement of the carriage, thereby to regulate the thickness of the slice.

With the foregoing and other objects in view, which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

Figure 2:
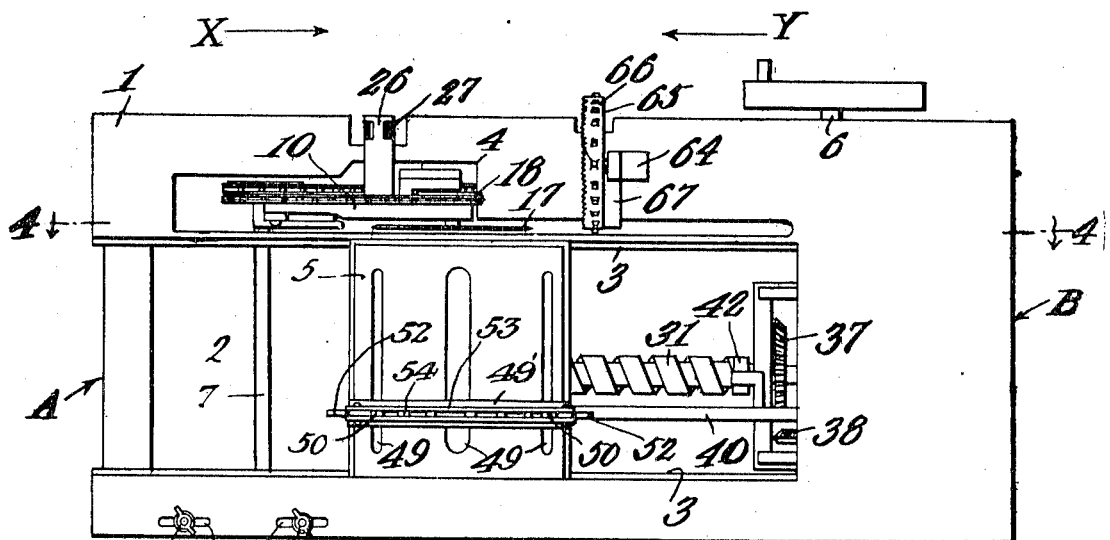

In the drawings,—Figure 1 shows the invention in elevation; Fig. 2 is a top plan;
Fig. 3 is an elevation, the machine being viewed from the opposite side, as compared with the showing of Fig. 1; Fig. 4 is a vertical longitudinal section upon the line 4—4 of Fig. 2, parts appearing in elevation; Fig. 5 is a horizontal section upon the line 5—5 of Fig. 1; Fig. 6 is a plan of the pawl and ratchet mechanism whereby the feed screw of the slice-regulating means is operatively connected with its actuating pinion; and Fig. 7 is an elevation of the rotary knives and of the parts whereby the same are operatively connected; Fig. 8 is a sectional detail showing the anti-frictional mounting of one of the rotatable elements of the structure;
and Fig. 9 is a perspective detail showing the cutter frame stop in operative position.

In carrying out the invention there is provided a supporting structure including a table 1, which table 1 may be of any desired form depending upon whether the machine is to be placed upon a counter, or is to be individually supported, the latter expedient being shown in the drawings. For convenience in description, that end of the table 1 to which the reference character A is applied will be considered as the forward end, that end of the table to which the reference character B is applied being considered as the rear end.

In the table 1 is fashioned an opening 2 extended longitudinally of the table, the opening 2 being equipped along its inner edges with guides 3 extended from the front of the table toward the rear thereof. Adjacent the opening 2 is another opening 4 extended longitudinally of the table, but of materially less width than the opening 2. The carriage, denoted generally by the numeral 5, is mounted to slide upon the guides 3 longitudinally of the table 1.

Disposed transversely of the table 1 and supported for rotation below the table, adjacent the rear end thereof, is a drive shaft 6. An auxiliary shaft 7, disposed parallel to the drive shaft 6, is supported for rotation below the table 1 adjacent the forward end of the table. The shafts 6 and 7 carry, upon their protruding ends, sprocket wheels 8, operatively connected by a sprocket chain 9.

A mechanism is provided for severing the flesh as the meat is moved with respect to the table 1, upon the carriage 5. In order to support this cutting mechanism, a frame 10 is mounted for rocking movement upon the auxiliary shaft 7, this frame 10 extending longitudinally of the machine. The frame 10 includes a lower arm 11 disposed below the table 1, and an upright 12, extended above the table 1 through the opening 4. The frame 10 and its lower arm 11 and its upright 12 have no relative movement with respect to each other, but these parts, taken as an entity, are so mounted upon the auxiliary shaft 7 that they may tilt thereon. Downward movement of the frame 10 is limited by means of an L-shaped stop 14, engaging the arm 11 of the frame and connected with a thin bar or rib 14$^a$ constituting a part of the table 1 and lying between the openings 2 and 4. This portion of the structure will be understood best when Fig. 9 is examined. An upper arm 15 constituting a part of the frame, is located above the table 1, the arm 15 being extended in the same general direction as the lower arm 11. The upper arm 15 is pivoted, as shown at 16, to the upper extremity of the upright 12.

Supported for rotation upon the rear end of the upper arm 15 is a rotary cutting knife 17, hereinafter referred to as the upper knife. The knife 17 is located above the table 1 and carries a sprocket 18. The lower knife 19 is journaled upon the rear end of the lower arm 11 and protrudes through the opening 4 in the table 1. The lower knife 19 is equipped with a sprocket wheel 20 and a sprocket chain 25 is trained about the sprocket wheel 20 and about one of a pair of sprocket wheels 24 which are secured to the auxiliary shaft 7, as will be best understood from an inspection of Fig. 5. A sprocket chain 21 is trained about the other of the sprocket wheels 24, the chain 21 being passed over a pair of idlers 22 carried by the ends of an arm 23 secured transversely upon the upright 12, the chain 21 being engaged with the sprocket 18 of the upper knife 17. The arms 15 and 11 are provided with lateral extensions 26 (see particularly Fig. 2) these extensions 26 registering slidably in the bifurcated ends of a guide 27 secured adjustably to one edge of the table 1 in any suitable manner such as by means of a bolt and slot union (not shown). The extensions 26 are united by a retractile spring 29.

Supported below the table 1 is, as seen most clearly in Fig. 5, a frame 30 in which the drive shaft 6 is journaled. The rear end of a primary lead screw 31 is also journaled in the frame 30, the primary lead screw being disposed substantially at right angles to the drive shaft 6. The forward end of the lead screw 31 is journaled in a hanger 32 which is supported from the table 1 to one side of the opening 2. Fixed to and extended from the carriage 5 is a follower 33, adapted to traverse the primary lead screw 31. Mounted within the frame 30 for sliding movement upon the drive shaft 6, longitudinally of the drive shaft, is a barrel 34. Fixed to one end of the barrel 34 is a beveled pinion 35 adapted to mesh into a beveled pinion 36 secured to the rear end of the primary lead screw 31. Secured to the other end of the barrel 34 is a beveled pinion 38 meshing into a beveled pinion 37 secured to the primary lead screw 31 slightly ahead of the pinion 36. When the pinions 35 and 36 are in mesh, the pinions 38 and 37 are out of mesh, and vice versa. The barrel 34 is slid longitudinally of the shaft 6 by means of an arm 39 carried by a shaft 40 journaled in the hanger 32 and in a supplemental hanger 41. The shaft 40, hereinafter referred to as the supplemental shaft, is equipped adjacent its ends with fingers 42 and 43. Carried by the table 1 and preferably attached immediately to the follower 33, is a trip denoted generally by the numeral 44. At its rear end the trip 44 is provided with a depending finger 45 adapted to ride beneath the finger 42, and to rock the shaft 40. The trip 44 also includes an upstanding finger 46 adapted to ride over the finger 43 and to rock the shaft 40 in an opposite direction.

A mechanism is provided for advancing the meats upon the carriage 5 transversely of the knives 17 and 19, so as to regulate the thickness of the slice. This mechanism includes a feed screw 47 supported for rotation upon the carriage 5, and disposed at right angles to the lead screw 31. A follower 48 is adapted to traverse the feed screw 47, the follower 48 passing upwardly through one of a series of slots 49 in the carriage 5, the follower 48 being connected with a bar 49' located on top of the carriage 5, the bar 49' having at its ends, upstanding standards 50, toothed to coöperate with latch levers 52, pivoted upon the ends of a clamp bar 53, provided with depending, meat-engaging prongs 54. The lower extremities of the standards 50 pass through other slots of the series 49, as will be best understood from an inspection of Figs. 2 and 4. A pinion 55 is connected with the secondary lead screw 47, to operate the same through the instrumentality of pawl and ratchet mechanism 56. The pinion 55 meshes into a rack bar 57 secured to the under face of the table 1 by bolt and wing nut connections 58, adjustably mounted in slots 59 extended longitudinally of the table.

The knives 19 and 17 are adapted to sever the flesh, and mechanism is provided for sawing the bone after the flesh has been severed by the knives. In fashioning this bone-severing mechanism, a beveled pinion 60, see Fig. 5, is secured to the drive shaft 6, the pinion 60 meshing into another beveled pinion 61 secured to a secondary shaft 62, supported for rotation below the table 1 and extended longitudinally of the table. The secondary shaft 62 carries a sprocket wheel 63 and another sprocket wheel 65 is supported for rotation above the table 1 upon a table-supported bracket 64. About the sprocket wheels 63 and 65 is placed a band saw 66 having openings adapted to engage the teeth of the sprocket-wheels. The band saw 66 is sustained by means of a saw guide 67 of any suitable form, which may be carried by the bracket 64.

It will be understood readily that any and all of the rotatable elements of the structure hereinbefore described may be anti-frictionally supported for rotation. Taking the shaft 7 as typical, this shaft is shown in Fig. 8 as supported upon ball bearings B.

The operation of the device hereinbefore disclosed is as follows:—Presupposing that the carriage 5 is located adjacent the forward end of the table 1, a piece of meat is placed upon the carriage 5 and the latch levers 52 are manipulated so as to permit the lowering of the clamp bar 53, the prongs 54 of the clamp bar entering the meat and binding the meat against the bar 49'. When the drive shaft 6 is rotated, either manually or by a prime mover, the beveled pinion 35 will mesh into the beveled pinion 36, causing a rotation of the primary lead screw 31, the lead screw, through the instrumentality of the follower 33 moving the carriage 5 in the direction of the arrow X to make the cutting stroke. When the carriage 5 has moved to the limit of its travel in the direction of the arrow X, the finger 45 of the strip 44 which is carried by the carriage 5, will ride beneath the finger 42 of the shaft 40 and rotate the supplemental shaft until the arm 39 engages the barrel 34 and slides the barrel, so that the beveled pinions 35 and 36 are out of mesh, the beveled pinions 38 and 37 being brought into mesh. When the primary lead screw is rotated reversely, the follower 33 and consequently the carriage 5, will be moved in the direction of the arrow Y to make the return stroke. At the end of the return stroke, the finger 46 of the trip 44 will ride over the finger 43 on the shaft 40, rotating the shaft 40, and causing the arm 39 to move the barrel 34, so that the pinions 36 and 35 will again be brought into mesh, whereupon another cutting stroke, in the direction of the arrow X, will be accomplished. When the drive shaft 6 is rotated in the manner hereinbefore described, the sprocket chain 9 will transmit motion to the auxiliary shaft 7. When the auxiliary shaft 7 is rotated the sprocket wheels 24 will be rotated likewise. One of these sprocket wheels 24 will actuate the sprocket chain 21 which, in its turn, through the instrumentality of the sprocket wheel 18, will cause a rotation of the upper knife 17. The other of the sprocket wheels 24, engaging the sprocket chain 25, will, through the instrumentality of the sprocket wheel 20, cause a rotation of the lower knife 19. When the carriage 5 moves in the direction of the arrow X, the meat will be passed between the rapidly rotating knives 17–19, whereupon the flesh will be severed. Should a bone be encountered, the upper knife 17 will ride over the bone by reason of the fact that the upper arm 15 which carries the knife 17 is pivoted to the upright 12, as shown at 16; and by reason of the further fact that the arms 15 and 11 are yieldably united by means of the spring 29, the spring 29 obviously serving to return the pivotally mounted upper knife 17 to a proper position with respect to the lower knife 19.

After the meat has been moved by the carriage 5, past the knives 17 and 19, the bone in the meat will come into contact with the bone-severing band saw 66. The shaft 6, through the medium of the intermeshing pinions 60 and 61, will impart rotation to the secondary shaft 62, the shaft 62 actuating the sprocket wheel 63 and consequently actuating the band saw 66 which is carried by the sprocket wheels 63 and 65. The band saw 66, obviously, is timed to sever the bone after the flesh has been severed by the knives 17 and 19.

The thickness of the slice is regulated by reason of the fact that the meat is moved transversely of the machine when the bars 50 and 53 are moved transversely of the carriage 5 through the action of the follower 48 and the secondary lead screw 47, the pinion 55 being engaged operatively with the secondary lead screw 47 at the extreme end of the return stroke, in the direction of the arrow Y, only, the pawl and ratchet mechanism 56 rendering the pinion 55 and consequently the secondary lead screw 47, inoperative, during the cutting stroke of the carriage 5 in the direction of the arrow X.

Owing to the fact that the guide 27 is adjustably held upon the table 1 through the means of the bolt and slot connection, the guide may be adjusted vertically so as to accommodate the vertical movement of the extensions 26 of the arms 11 and 15. The adjustable union effected by means of the connection 58—59 between the rack bar 57 and the table 1, serves to regulate the time at which the transverse movement of the parts 50 and 53 takes place, to advance another slice for severing.

Having thus described the invention, what is claimed is:—

1. In a device of the class described, a shaft; a frame pivotally mounted upon the shaft, for movement transversely of the shaft, the frame including a fixed arm and a yieldably supported arm; a stop engaging the fixed arm, to limit the movement of the frame in one direction; rotary knives carried by the arms; means for operatively connecting both knives with the shaft; and mechanism for advancing the meat against the knives.

2. In a device of the class described, a supporting structure; a frame mounted for pivotal movement thereon and including a fixed arm and a yieldable arm; a guide carried by the supporting structure; means upon the arms for slidably engaging the guide; spring means for drawing the arms together; rotary cutting knives journaled upon the arms; means for operating the knives; and means for advancing the meat against the knives.

3. In a device of the class described, a supporting structure; a guide carried thereby; a frame pivotally mounted with respect to the supporting structure, the frame including a fixed arm and a yieldable arm, each of which is provided with a projection adapted to slide in the guide; a spring uniting the projections; rotary knives journaled upon the arms; means for operating the knives; and means for advancing the meat against the knives.

4. In a device of the class described, a supporting structure; a guide thereon; a shaft journaled for rotation in the supporting structure; a frame tiltably mounted upon the shaft and including a fixed arm and a yieldably mounted arm, each of which is provided with means engaged in the guide; a spring connecting said means; rotary knives journaled on the arms; pulleys carried by the knives; pulleys carried by the shaft; a belt passed about the pulley of the knife of the fixed arm, and about one of the pulleys upon the shaft; spaced idlers carried by the frame; and a belt trained about the other pulley of the shaft, about the idlers, and about the pulley of the knife of the yieldably mounted arm.

5. In a device of the class described, a supporting structure; a shaft journaled for rotation therein; a guide carried by the supporting structure; a frame movably supported upon the shaft and including a fixed arm and a yieldable arm, each of which is provided with means to slide in the guide; a retractile spring uniting said means; rotary knives journaled upon the arms and belts operatively connecting the knives with the shaft.

In testimony that I claim the foregoing as my own, I have hereto affixed my signature in the presence of two witnesses.

ROBERT E. FORMAN.

Witnesses:
   CHAS. M. THOMAS,
   PEARCE PATON.